F. W. HILLARD.
TYPE WRITING MACHINE.
APPLICATION FILED JUNE 15, 1916.

1,296,957.

Patented Mar. 11, 1919.
9 SHEETS—SHEET 1.

Inventor
Frederic W. Hillard
By his Attorneys,
Kerr Page Cooper & Hayward

F. W. HILLARD.
TYPE WRITING MACHINE.
APPLICATION FILED JUNE 15, 1916.

1,296,957.

Patented Mar. 11, 1919.
9 SHEETS—SHEET 4.

Inventor
Frederic W. Hillard
By his Attorneys
Kerr Page Cooper + Hayward

UNITED STATES PATENT OFFICE.

FREDERIC W. HILLARD, OF TOTTENVILLE, NEW YORK, ASSIGNOR OF ONE-HALF TO MARY R. HILLARD, OF MIDDLEBURY, CONNECTICUT.

TYPE-WRITING MACHINE.

1,296,957.  Specification of Letters Patent.  Patented Mar. 11, 1919.

Application filed June 15, 1916. Serial No. 103,758.

*To all whom it may concern:*

Be it known that I, FREDERIC W. HILLARD, a citizen of the United States, residing at Tottenville, in the county of Richmond and State of New York, have invented certain new and useful Improvements in Type-Writing Machines, of which the following is a full, clear, and exact description.

This invention relates to certain new and useful improvements in typewriters and is particularly directed to improvements in the typewriter carriage and parts acting in conjunction therewith.

One of the objects of the invention is to secure an easy running and rapid feeding carriage in a visible typewriting machine and at the same time provide a carriage which may be readily swung upward so that the parts of the mechanism thereunder may be readily inspected, repaired and cleaned. This swinging movement of the carriage also is an advantage in that the writing may be inspected practically to the last line on the sheet and the operator by so swinging the carriage can readily tell just how much space is left at the bottom of the sheet or card.

In carrying out the above objects I provide a truck at the rear of the machine which truck is always locked against shifting movements. The truck is provided with an improved ball bearing anti-friction support and race-ways therefor so that the truck may move endwise with the minimum of friction. To this truck is pivoted a carriage structure. The carriage comprises two parts, an outer non-shiftable carriage which is hinged at its rear to the before mentioned truck and which is supported at the front of the machine upon a suitable guide way.
Carried by this non-shifting carriage is an inner paper carriage which is adapted to be shifted into upper or lower case positions by the usual shift rail. The outer carriage is normally locked against a lifting movement by the guide way at the front of the machine and this guide way is so arranged that when the carriage is in predetermined endwise positions, the carriage is unlocked therefrom and may be swung upward by the operator. When the carriage is being swung upwardly, means are provided to lock the carriage against endwise movement under the influence of the tension spring and these means are effective regardless of the inner carriage being in upper or lower case position. I also provide means for locking the carriage in extreme upward position so that repairs and cleaning may be readily carried out and so that the printing ribbon may be easily and conveniently inserted in and removed from the ribbon holder.

My invention also contemplates an improved friction brake for tabular use which brake is associated with the before mentioned truck in such a way that the speed of the feeding movements of the truck may be reduced to any desired extent by means of pressure applied to the bearing balls by the tabulating key.

My invention also contemplates various other detail improvements in connection with the before mentioned objects, which improvements will be more fully pointed out in the accompanying drawing, specification and in the appended claims.

In the accompanying drawings, which form a part of the specification, the improvements are fully illustrated. The machine is generally of the well-known type of Underwood typewriter, excepting for the various modifications and improvements herein shown and described, and it will, therefore, be understood that I have left out from the various drawings those parts of the machine which are unnecessary to illustrate the invention, thereby making the illustration of the various features of invention simpler and clearer than they would be were unnecessary parts shown.

Fig. 2 is a side elevation of the carriage parts shown in Fig. 1. This view also shows in dotted lines the position of the carriage when in elevated position and locked in such position.

Figs. 2$^a$ and 2$^b$ are details of the locking device for the carriage which maintains it in extreme elevated position.

Fig. 9ª is an end detail view of the cages.

Fig. 3 is a detail view of a modified front rail to be used when the carriage is to be lifted at two positions on its line travel.

Figure 1:
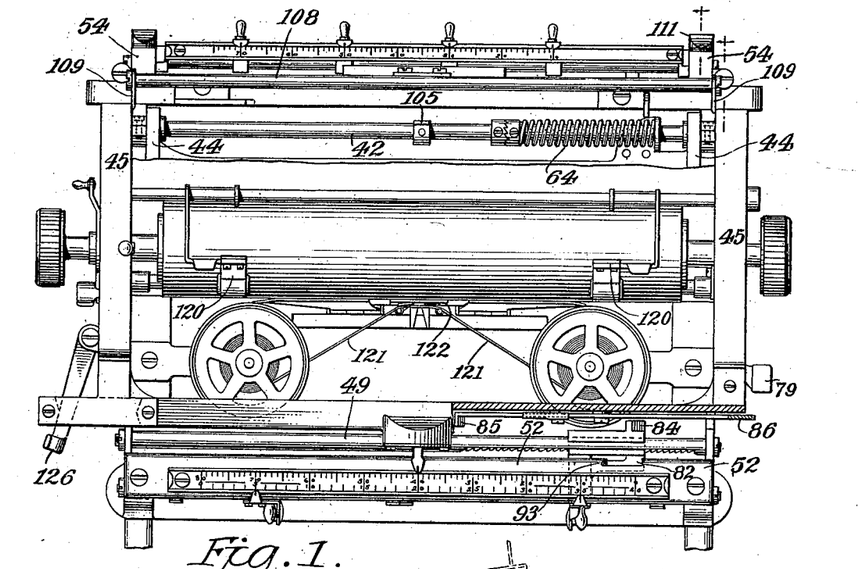
Figure 1 is a plan view of the machine.

In the drawings, referring particularly to Figs. 1, 2, 4 and 30, the preferred embodiment of my invention comprises a truck 40. Extending forwardly and upwardly from this truck are brackets 41 which pivotally support a shaft 42. This shaft forms a pivotal support for both the inner and outer carriage. The outer carriage which I will also term the non-shiftable carriage is shown at 43 and this carriage carries rearwardly extending lugs 44 which pivotally engage shaft 42 see Fig. 1. The inner carriage also termed the shifting carriage is shown at 45 and this carriage is provided with suitable brackets which support studs which pivotally engage in the forward ends of the shift arms 406. The bearing in the forward end of these shift arms are closed over with caps 46ª instead of being open as in the Underwood machine since it is necessary that the carriage be retained in position when swung upwardly. The opposite (rear) ends of the shift arms 46 are fixed to the ends of the shaft 42, as shown in Fig. 1.

Figure 29:
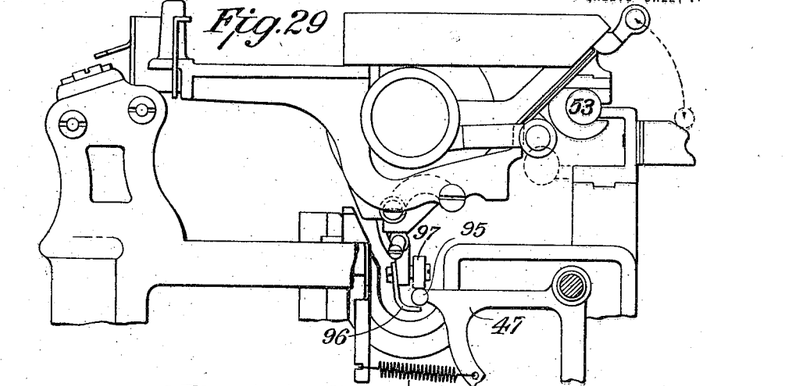
Fig. 29 is a view of the Standard Underwood Typewriter showing shift rail and a part of the operating devices therefor.

The inner shifting carriage is adapted to be vertically raised and lowered by any of the well known shift constructions for example as shown in Fig. 29 in which 47 represents a part of the linkage connecting with the shift key. As this mechanism is well known in the Underwood machine, further description and illustration is believed to be unnecessary.

Figure 14:
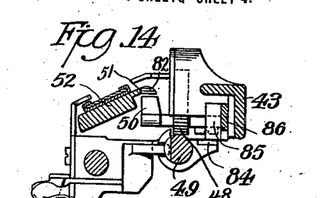
Fig. 14 is a sectional view taken on line 14—14 of Fig. 13.
Figure 21:
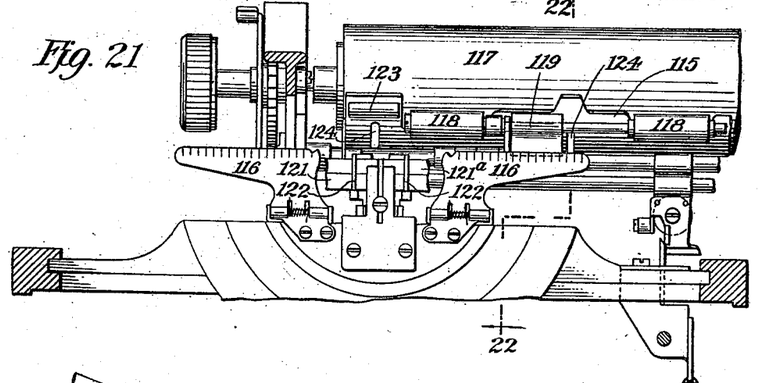
Fig. 21 is a front view of the paper carriage in semi-elevated position showing the coöperation of camming devices with the paper scales. This view also shows the coöperation of certain of the locking devices.

The front end of the outer carriage 43 is provided with a supporting wheel 48 see Fig. 14, which travels on the front guide rail 49. It is also provided with a locking finger 50 which underlies a slot 51 in upper front rail 52. This is the usual construction. The hinge joint at 42 between the carriage and the truck permits the carriage to adjust itself to its position on guide rail 49 and prevents friction by undue pressure, against either of the front rails.

In the usual Underwood construction there is no truck, the carriage being mounted upon a fixed guide rail 53 at the rear as shown in Fig. 29. The advantage of the truck over the fixed guide rail is that antifriction devices may be more readily applied thereto. Furthermore the truck affords a stable anchorage for the carriage when it is swung up and elevated as shown in dotted lines in Fig. 2.

Figures 2, 2A, 2B:
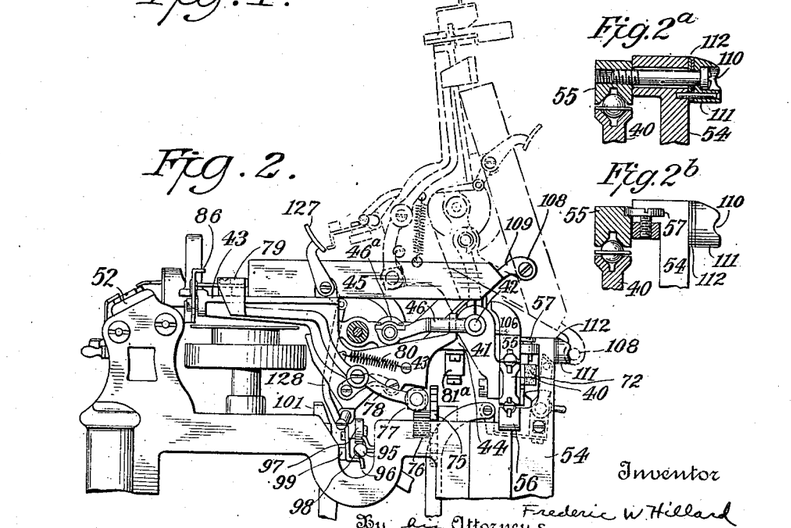

The truck 40 is mounted upon the machine frame in the following manner. Two upwardly projecting arms 54 extend from the machine frame. Upper and lower race way rails 55 and 56 are secured to these arms and are preferably adjustable to and from each other. As shown in Figs. 2$^a$ and 2$^b$ and 10, the upper race way is adjustable toward the lower race way by means of adjusting screws 57. The truck 40 has upper and lower race ways which are oppositely disposed to the upper and lower race ways in race way rails 55 and 56. See Figs. 7, 8, 9, 11 and 12.

In the above race ways I utilize ball or roller bearings to minimize friction. I preferably use the arrangement shown in Figs. 7, 8 and 9. I use three balls to each bearing, there being four bearings in the machine, two in each race way. The two outer balls 58 of each bearing are of full standard size to fill the race way whereas the intermediate balls 59 are of slightly smaller diameter. The function of the small ball 59 between the large balls is to reduce friction by causing the bearing surfaces of outer balls to travel in the same direction instead of traveling against each other as would be the case if there were only two balls in each bearing.

Figures 8, 9, 9A:
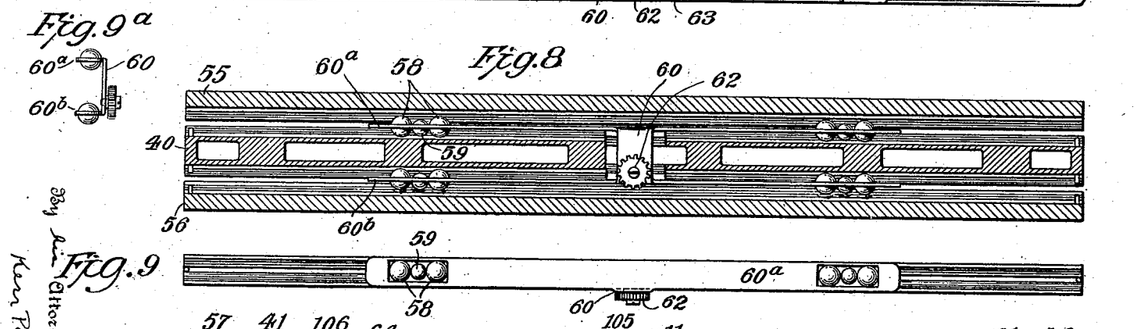
Fig. 8 is a central sectional view of the truck.
Fig. 9 is a plan view of the ball bearing cage and race ways.

The direction of movement of the balls may be seen by referring to the arrows placed under the balls in Fig. 8. From this figure it will appear that the engaging points between each pair of balls i. e. small ball 59 and large ball 58 moves upwardly and downwardly together. The fact that the small balls move in a direction opposite to that in which the truck is feeding does not create friction since these balls are so small that the truck cannot rest upon them.

In ball-bearing structures for many typewriter carriages heretofore in use, one ball has been provided for each bearing, with the result that there is a single bearing point only between the raceways and balls at each bearing. Hence any imperfections in the raceways, in the line of travel of the bearing-balls, would disadvantageously affect the bearing, making a bearing loose at one point and tight at another. By putting the two balls in each bearing, particularly if they be spaced a little way apart by an intermediate spacer ball, much better results are obtained, since if one of the bearing balls in the bearings drops into a little pit or hollow in the raceways, the other bearing ball in the same bearing will presumably be resting on a perfect portion of the raceway bearings. Furthermore, by having two bearing-balls in each bearing, or eight bearing balls in all in the four bearings, instead of four altogether as in those heretofore in use, much more durable bearings are provided, the weight of the truck and carriage being distributed over double the number of bearing-balls, resulting in greatly lengthened life in the bearings over those heretofore in use. It will be understood that I may use rollers in place of balls if desired. If desired the construction shown in Figs. 40 and 41 may be utilized where rollers 58$^a$ carry the load and are spaced apart by a spacing ball 59$^a$ of less diameter than rollers 58$^a$. In the claims the item "roller" is to be considered a broad term referring to either a ball or roller construction. The balls or rollers and their retaining cage 60 move at one-half the speed of the movement of the truck and carriage, as will now be described.

Upon the front of the truck 40 and adapted to travel in unison therewith is a downwardly facing rack 61 which engages a pinion 62 carried by the ball retainer. The ball retainer has one portion 60$^a$ in the upper race way and another portion 60$^b$ in the lower race way. Upon the lower race way 56 I mount a second rack 63 which also meshes with pinion 62. The result of this construction is to move the ball retainer at one half the speed of the truck thereby always retaining the balls in their proper position in the race ways and preventing what is known as a creeping movement. This creeping of the balls would otherwise take place where short lines of work are written for any considerable period of time. The balls then gradually creep out of position so that when a longer line is written they would come to the end of their line of travel before the truck had reached such a point. The ball retainer 60 causes practically no friction since it is geared to travel at proper speed with respect to the truck.

As previously explained the truck 40 has upwardly projecting arms or brackets 41 which pivotally support shaft 42. The lifting or shifting arms 46 are pinned to the ends of this shaft and the usual spring 64 is coiled about this shaft to assist in lifting the inner carriage 45. I also employ a second spring 65, see Fig. 29, to assist the lifting of the shift rail and inner carriage to upper case position. This spring is similar to the corresponding spring used for the same purpose on the Underwood machine.

Upon the rear side of the truck there is mounted a plate 66 which serves both as a margin stop for the truck and carriage as will be hereafter explained. This plate forms one of the elements of the tabulator which will now be explained.

Tabulator.

The tabulator key and connecting links are the same as in the Underwood machine and need not be described in detail.

Referring to Figs. 11, 12 and 35, 67 represents a pull bar operated by the tabulator key (not shown), this rocks rocker arm 68 which in turn swings the tabulator bar 69 rearward, and tabulator friction bar 70 and tabulating stops 71 forward. These parts operate in substantially the same way as do the corresponding parts in the Underwood machine. The friction bar 70 presses against a brake leather 72 which is carried upon the plate 66 which plate is supported upon and moves in unison with the truck. The pressure against the brake leather has the usual retarding effect upon the movement of the truck and in addition the pressure against the leather tends to push the entire truck, particularly the upper half thereof, forward and to thereby crowd the bearing balls 58 between the stationary race ways 55 and 56, and the corresponding race ways in truck 40. This crowding of the bearing balls against their race ways constitutes an additional extremely sensitive and reliable brake, in fact a more reliable brake than the leather brake which is liable to wear. It is to be understood that I claim this feature broadly and do not limit its use in combination with the sliding brake. It may be so used or the sliding brake can be omitted or it can be used in combination with other forms of brakes. The detailed description of the operation of the tabulator need not be set forth as the action is similar to that of the well known Underwood tabulator.

Hinged carriage.

As previously set forth one of the objects of this invention resides in the provision of a hinged carriage which may be swung up and maintained in elevated position when desired. The elevated position of the carriage is shown in dotted line position in Fig. 2 and also in Fig. 32. From these figures it will appear that both the inner and outer carriages are mounted at their rear on shaft 42 and when elevated these carriages both swing about shaft 42 as a hinge pivot. In Fig. 2 the escapement is of the well known form used in Underwood machines. The carriage rack 77 is mounted upon pivoted arms 78 one of which has an extension 79 forming a release key for the carriage. A spring 80 maintains the rack in engagement with the pinion 76. The main spring which imparts endwise movement to the carriage is not shown but is of the usual construction. It is sufficient to state that a flexible tape 81 connects the main spring with the outer carriage the bracket for this connection being shown at 81ª. It will therefore be seen that after the carriage has been elevated to an extent to free the rack from the escapement pinion, the carriage structures will be directly under the influence of the main spring and will tend to move to the left unless restrained. I will now describe the locking devices which prevent such movement. There are three of these locking devices which prevent an endwise movement of the carriage under the influence of the main spring after the rack 77 has been swung with the carriage up free of the escapement pinion 76. The first of these locking devices controls the carriage during its initial movement and will now be described.

Figure 10:
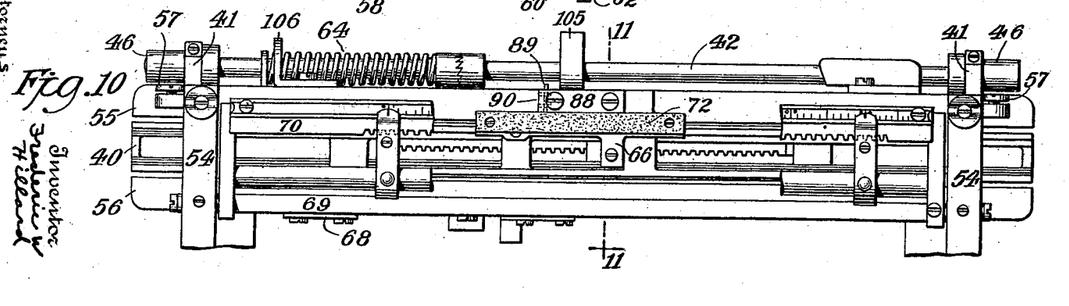
Fig. 10 is a rear view of the truck showing the brake and one of the carriage locks.

By referring to Fig. 1 it will be seen that the upper front rail 52 is notched as shown at 82. See also Figs. 13, 14, 16, 30, 38, 39, and 40. This notch permits the nose of locking finger 50 to escape from its normal position below the front rail 52 when it is desired to elevate the carriage. I preferably place the notch near the right hand end of the rail but it may also be placed in other positions as hereinafter explained. The usual Underwood margin stops may be employed. Briefly stated these stops comprise abutment members 84 which can be set in any desired position. As the carriage advances a nose portion 85 of margin release lever 86 contacts with the abutment and prevents a further movement of the carriage to the right. To further move the carriage to the right it is necessary to depress the margin release lever and free the nose from the abutment, see Figs. 1, 2, 13, 14, 15. The extreme right movement of the carriage is also limited by the rear margin stop which is shown in Fig. 10 and in detail in Fig. 35. This margin stop comprises a plate 66 which is rigidly connected with the truck 40. This plate has an upwardly projecting portion 87. Suitably secured by screws to this portion of plate 66 is an L shaped piece 88. The screw holes in this piece are slightly elongated so that the piece 88 can be set at any desired longitudinal position with respect to plate 66. The L shaped piece 88 carries dowels which coöperate with holes in shim pieces 89. By using shim pieces of different thicknesses the position of the L shaped piece 88 can be set very accurately. When the carriage moves to the right, the end 90 of the L shaped piece finally abuts against the side frame bracket 54 which supports the upper raceways 55 and thus limits the extreme movement of the carriage and truck. Brake leather 72 clears bracket 54, see Figs. 2 and 25.

The purpose of the herein described elements of the back margin stop is to bring the face 90 of the L shaped piece at exactly the proper position for bringing the carriage to the starting point. This is a very particular adjustment in typewriting machines, because if the engaging face of the margin stop be slightly too far to the right or left the carriage is apt to be brought back either not far enough and begin the margin a letter space too far to the left, or to be brought back too far and begin the margin of the line within the marginal space, making a bad looking page of writing. The shims 89 prevent the blow of the returning movement of the carriage from overcoming the frictional hold of the screws and crowding the L shaped plate 88 along relatively to the retaining plate 66. These shims also aid in manufacturing since it is practically impossible to make all of the parts such as truck, margin stop and escapement exactly interchangeable. The shims and mechanism for inserting and holding them overcome this defect very efficiently and quite inexpensively.

Assuming that the carriage is engaged under the front rail and the rack 77 is in engagement with the escapement pinion 76. Therefore the escapement will be under the influence of the main spring. Consider the carriage being restored to the right by the operator. If the carriage is drawn as far to the right as possible and then released, the escapement is so constructed that the carriage can move back to the left under the influence of the motor spring for about one letter space. Here the escapement will be arrested by the escapement dog coming in contact with the escapement rocker stop. With my preferred arrangement the notch 82 in the upper front guide plate 52 is so disposed that with this condition i. e carriage arrested by the escapement, the nose 50 will underlie the rail and therefore it will be impossible to lift the carriage. See Fig. 39. To lift the carriage it is necessary that the carriage be forced slightly to the right against the rear margin stop. With this condition the parts will assume the position shown in Figs. 38 and 13 and it will be possible to lift the carriage since the retaining finger 50 is now under the open portion of the slot 82.

It will be understood that with the parts in this position there will be a certain amount of tension from the motor spring which will tend to draw the carriage toward the left. The locking device to prevent this movement consists of the side 92 of the nose 50 and an end 93 of the slot 82, see Figs. 13, 16, 38 and 39. The end 93 is beveled but it may be made straight if desired. The above mentioned nose and end of the slot constitute the first carriage lock.

It will be understood that the nose upon the further upward movement of the carriage will pass to a position out of engagement with the beveled end of the slot and when in this position another lock must be employed to prevent an endwise movement of the carriage under the influence of the spring. This lock I call the number two lock and it is so arranged and timed that it comes into action before the first mentioned lock i. e. the number one lock has ceased acting.

I will now describe this lock which I will term the number two lock. In the usual Underwood construction the shift rail 95 is adapted to be lifted from lower case to upper case position by means of the shifting devices shown at 47 in Fig. 29 and which connect with the shift keys in the usual manner. Coöperating with the shift rail is a locking finger 96 and a guide wheel 97 which are suitably connected with a bracket extending downwardly from the inner carriage as shown in Fig. 29 and similar to the usual Underwood construction. These parts I employ by modifying them slightly to act as the number two lock.

Figure 6:
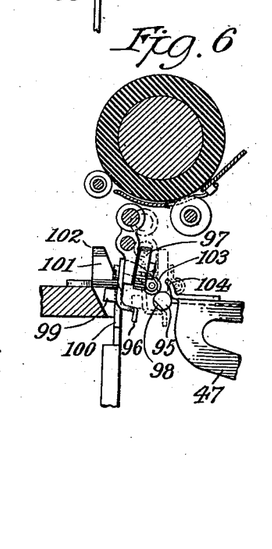
Fig. 6 is a sectional view taken on the same lines as Fig. 5 and showing the shift rail in upper case position. The dotted lines in this view show the parts in normal position on the shift rail and the full lines show the parts just before reaching normal position. This view also shows the coöperation of the locking devices.
Figure 7:
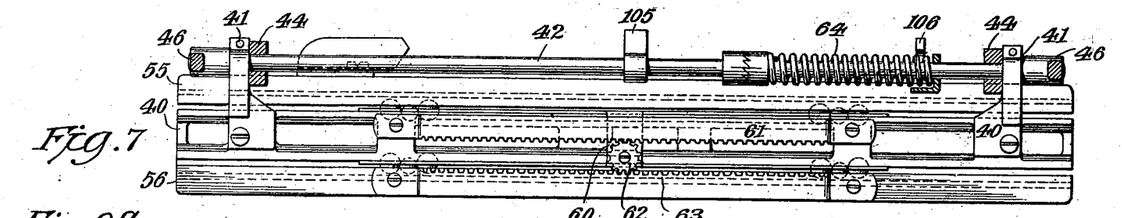
Fig. 7 is a front view of the truck.
Figures 30, 35:
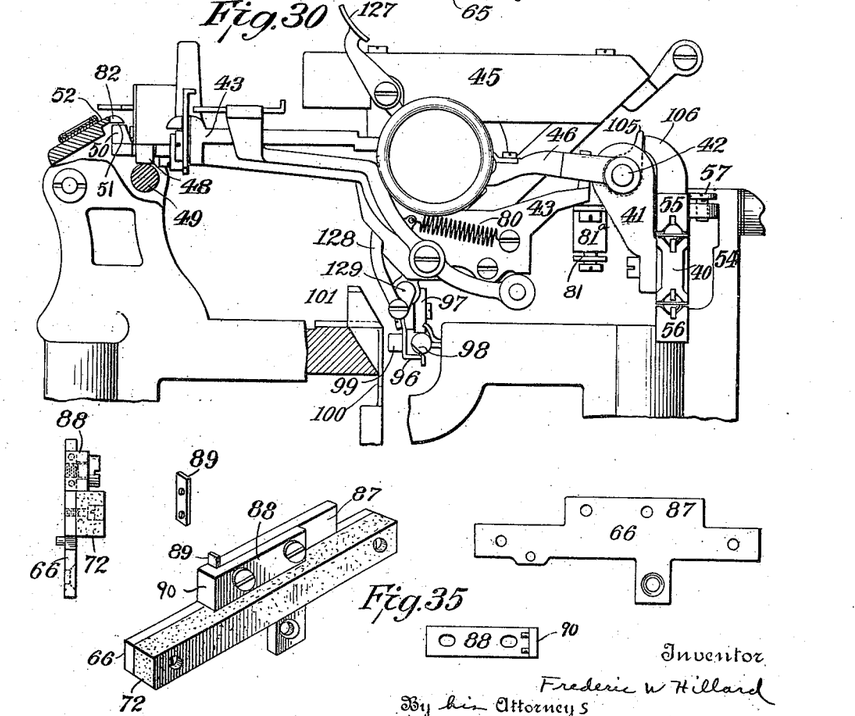
Fig. 30 shows a side view similar to Fig. 2 but with the inner carriage in upper case position. This view shows the action of the various locking devices when the parts are in this position.
Fig. 35 shows detail views of the rear margin stop.
Figure 36:
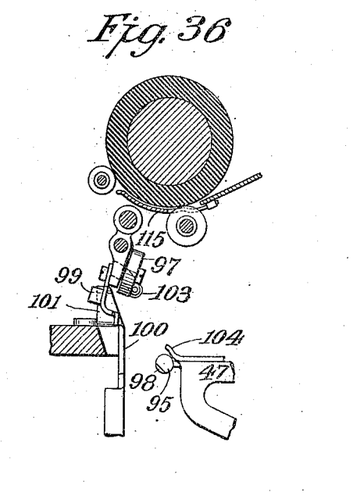
Fig. 36 is a detail view of one of the locking devices i. e., the number two lock. The shift rail is in lower case position and the carriage is swung upwardly and engaged by the locking devices.
Figure 37:
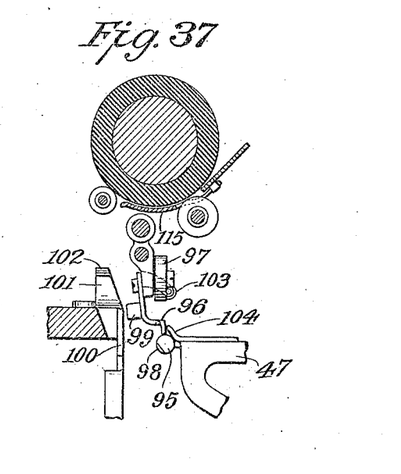
Fig. 37 shows an abnormal condition of the parts. The shift rail is in lower case position and the inner carriage is being swung down while in upper case position relatively to the outer carriage.
Figure 38:
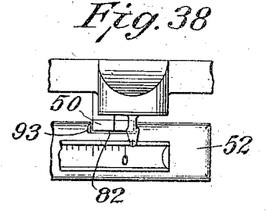
Figs. 38 and 39 are detail views of the notched position of the front rail showing certain locking conditions.
Figure 39:
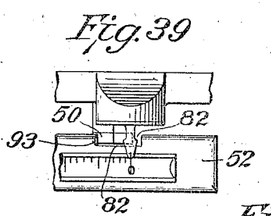

The locking finger 96 locks the carriage down upon the shift rail and in order to permit the carriage to be swung upwardly I cut away or flatten a portion of the end of the shift rail as shown at 98 in Figs. 2, 3, 5, 6, 35, 36 and 37. The length of this flattened portion of the shift rail and its position thereon is such that the carriage cannot be lifted except at the time the first mentioned number one lock will permit the carriage to be lifted. That is to say when the carriage is drawn to the limit of its movement to the right. The locking finger 96 is preferably provided with a projecting lug 99. When the carriage is swung upwardly this lug is adapted to engage the edge 100 of a struck up plate which is carried by one of the frame members. See Figs. 5, 17, 18. The parts are so arranged that lug 99 comes into coöperation with the edge 100 of the plate before the face 92 of nose 50 has passed out of engagement with the end 93 of the front rail 52. It will be understood that with the lug 99 so engaging edge 100, no endwise movement (to the left) of the carriage can take place. Upon further upward movement of the carriage the lug 99 passes behind an upwardly extending ear 101, standing in the same plane as edge 100. See Figs. 17, 30 and 36. Fig. 36 shows the carriage being lifted with the shift rail 95 in lower case position and with lug 99 and the edge of the locking finger engaging the ear 101, the inner carriage being in its lower case relation to the outer carriage. It will be apparent that with this condition of parts there can be no endwise movement of the carriage under the influence of the main spring. Fig. 6 shows a somewhat similar locking condition but with the shift rail lifted and the inner carriage in substantially upper case level. Here again the lug effectually prevents an endwise movement of the carriage. The dotted line position of the parts illustrates their normal position with the carriage and shift rail in upper case position but with the lug clear of the locking plate. Figs. 6, 35 and 36 will illustrate that regardless of the carriage position i. e, upper or lower case, the number two lock, as shown, will be effective to prevent an endwise carriage movement under the influence of the main spring. This condition continues until the carriage passes under control of the number three lock which it will be understood is my preferred construction.

In restoring the parts downwardly i. e., swinging the carriage to a position to engage the shift rail it is desirable that the engagement be made with a minimum of friction and interference. I accordingly bevel the top edge of the ear 101 as shown at 102. This may act as a cam and properly guide the locking finger 96 and lug 99 to one side of the ear 101. I have also found that the edge of guide wheel 97 interferes with the side of the shift rail 95 during the restoring movement when the shift rail is in upper case position. I accordingly provide a roller 103 on an extension of the locking finger, see Fig. 18. This roller is adapted to engage the top of the rail and hold the inner carriage in its upper case position whereby the guide wheel moves over on the top of the shift rail without interference. Binding between the guide wheel and the shift rail is thus prevented when the shift rail is in upper case position. The function and action of roller 103 when the shift rail is in upper case position is (upon the downward swinging movement of the carriages) to arrest the inner carriage in substantially upper case level. The outer carriage completes its downward movement to normal position, the roller 103 serving to produce a relative movement between the inner and outer carriages until the inner carriage takes an upper case position with respect to the outer carriage.

With certain abnormal conditions of parts which rarely occur in practice, i. e. with inner carriage in upper case position and shift rail in lower case position, I have found there is a possibility for the locking finger to slide over and lock on the top of the shift rail. To prevent such an occurrence, I provide the shift rail devices 47 with a tongue 104 which extends over the top of the shift rail, at the extreme right thereof. See Figs. 19 and 36. This tongue prevents the downwardly extending end of the locking finger from engaging entirely behind the shift rail and so holds the parts that if the shift rail is elevated by a depression of the shift key the rail will act as a cam and force the locking finger forward to a position in which it can clear the shift rail and drop to the normal position as shown in dotted lines in Fig. 6. Any slight jarring of the carriage will also restore the locking finger to its proper normal position.

The number one and number two locks just described are entirely ineffective to restrain the endwise movement of the carriage. This is shown clearly in Fig. 30 which shows nose 50 clear and free to move under the rail 82 and lug 100 of the number two lock clear of the locking edge 101. This condition is true for either lower or upper case carriage positions the latter being shown in this view. As previously pointed out however if the carriage is lifted the number one lock will first come into action. Thereafter the number two lock will act before the carriage is released from the number one lock.

Number three lock.

Figure 31:
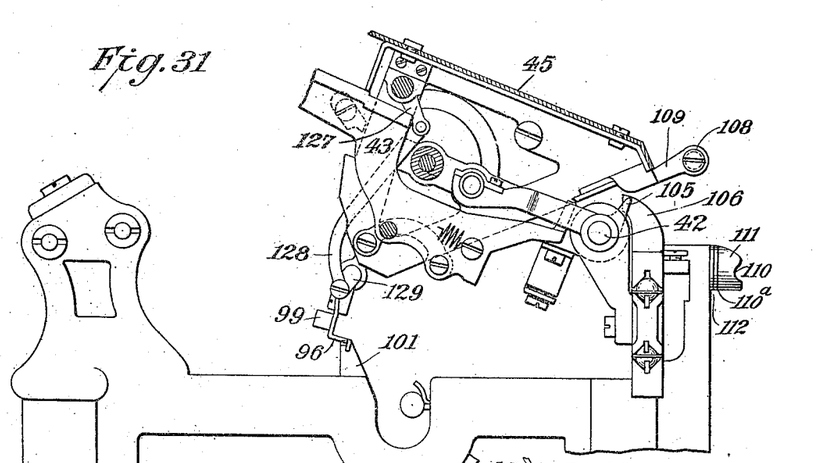
Fig. 31 shows the carriage in semi-elevated position and with the inner carriage in lower case relation to the outer carriage and shows the action of the locking devices when in this position.
Figure 32:
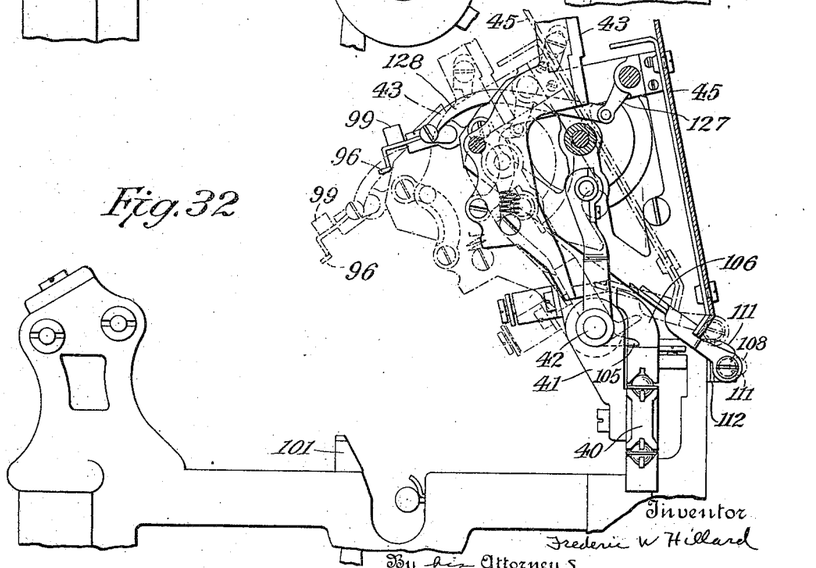
Fig. 32 shows the carriage in extreme elevated position, with the inner carriage in its relative upper case position and shows how the carriage is locked in this position.

Referring to Figs. 31 and 32 it will be seen that after the carriage is lifted to a certain extent the lug 99 and the end of locking finger 96 will pass beyond the control of ear 101 and the carriage therefore unless it is restrained will be drawn to the left by the main spring. I accordingly provide an additional lock which is arranged to come into action before the number two lock loses its control over the carriage. This lock will now be described, particular reference being made to Figs. 1, 2, 10, 20, 31 and 32.

Rigidly secured to shaft 42 is locking finger or dog 105. As the carriage is lifted upwardly and swung about 42 as a center, shaft 42 will be rocked in a clockwise direction (in Fig. 20). This rocking movement takes place since shift arms 46 are rigidly secured to the shaft. Locking finger or dog 105 is rocked rearwardly in unison with the shaft and is adapted to move into coöperation with a restraining arm 106. See dotted line position of the dog in Fig. 20 and also position in Fig. 32. Before lock number two becomes ineffective to restrain the carriage the dog 105 will engage the side of the restraining arm 106 and since the restraining arm is fixed in position on fixed race way rail 55 movement of the carriage to the left under the influence of the spring will be prevented.

The above locks, i. e. numbers one, two and three effectually restrain the carriage against endwise movement during any point in the lifting of the carriage, about their hinge pivot but at the same time are entirely ineffective when the carriage is in normal upper or lower case writing position.

Fig. 30 shows the condition of lock number three with the carriage in upper case writing position. When in this position shaft 42 has been rocked to a slight extent but dog 105 is still clear of the restraining arm 106.

Back lock.

In order to hold the carriage in upper position as shown in full lines in Fig. 32 so that a repair man may work upon the parts and to permit erasure and inspection of work I provide a lock which will now be described. In Figs. 1, 2, 2$^a$ and 2$^b$, 31 and 32, 108 represents a back rod which forms a support for the margin paper guide in the usual Underwood machine. This rod is carried on brackets 109 which project rearwardly from the inner carriage frame 45. When the carriage is swung rearward and upward about the pivot 42 this rod contacts with the upper beveled cam edge of a stud 111 which is secured to right hand frame brackets 54. It will be understood that the inner carriage as it is elevated is in lower case position, maintaining this position by gravity. This is shown by Fig. 31 and the dotted line position of parts in Fig. 32. A further rearward movement of the carriage through the contact of rods 108 with the stud 111 cams the inner carriage from lower case position to upper case position as shown by the full lines in Fig. 32. The rod 108 finally snaps into a recess 110 in stud 111 and thereby maintains the carriage in upper locked position. The above described camming movement of the carriage from inner to upper case position is of decided advantage in that when the carriage is finally locked up in raised position both inner and outer carriages are in effect locked together. When so locked the inner carriage and platen roll are held rigidly and do not yield or vibrate. Erasures can then be readily made and repairs and cleaning of the machine by the operator or repair man can be readily carried out. It will be understood that the rod 108 has sufficient resiliency to spring into place in the recess 110. To lock the carriage up the operator merely lifts the carriage until the rod catches and to lower the carriage a forward pull will disengage the rod from the recess. It may be desirable to strengthen or weaken the back lock. This is done by the insertion or removal of one or more washers 112, see Figs. 2$^a$, 2$^b$ and 31.

Paper feed roll guards.

Figure 22:
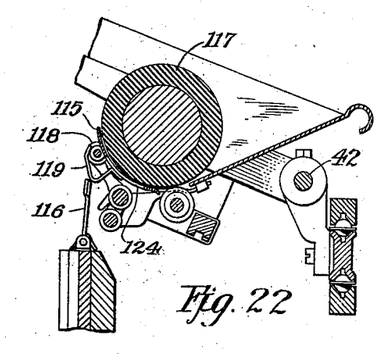
Figs. 22 and 23 are sectional views taken on line 22—22 of Fig. 21 showing the operation of the camming members.
Figure 23:
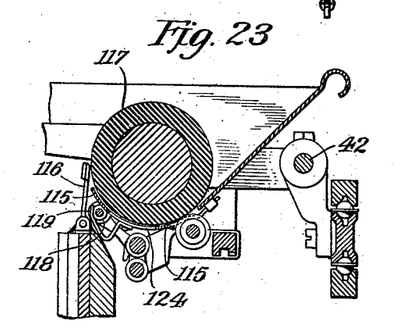

The paper feed rolls and their mechanism are similar to those used in the Underwood machine. Referring particularly to Figs. 3, 21, 22, 23, 24 and 34, 115 represents the paper feed plate and 116 are the usual paper scales in the Underwood machine. These paper scales are usually spring pressed toward platen roll 117 and on account of their position there will be interference between them and certain of the paper feed rolls 118 and the supporting structure therefor when the carriages are being swung downwardly about their hinge pivots at 42. In order to prevent such interference I provide a camming member 119 on feed plate 115. This camming member is so disposed laterally on the plate that upon the carriage being depressed it will force the paper scale 116 back as shown in Fig. 22. This camming member 119 in this way prevents mutilation of feed roll 118, bending of the paper scale and friction and interference.

Figure 34:
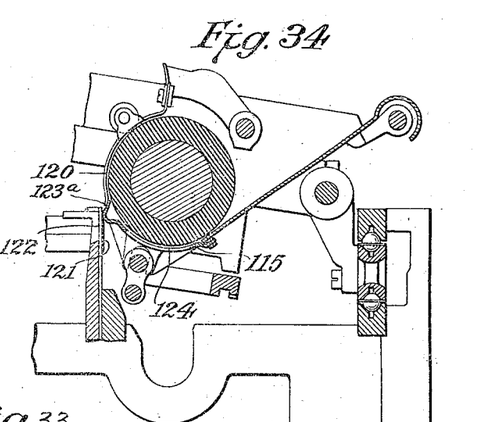
Fig. 34 shows in side elevation the operation of the ribbon camming member.

I have also found that interference is apt to occur between the paper clip 120 and the ribbon 121 during the downward movement of the carriage from its raised position, see Fig. 34. The printing cylinder is normally in close proximity to the ribbon holder 122 and the ribbon 121 is held between the printing cylinder and the holder. The lower end 123$^a$ of the paper clip is bent slightly outwardly away from the cylinder in order that the paper advancing from beneath the curved retaining plate 115 will be sure to feed in between the printing cylinder and the paper clip. Therefore in case the paper clip is in line with the ribbon holder, when the carriage is being lowered, as may be the case, the end 123$^a$ of the paper clip is apt to slide in between the ribbon holder and the ribbon, and pull and tear the ribbon thus making the machine inoperative.

Figures 11, 12, 15, 16, 17, 18, 19, 20, 40, 41:
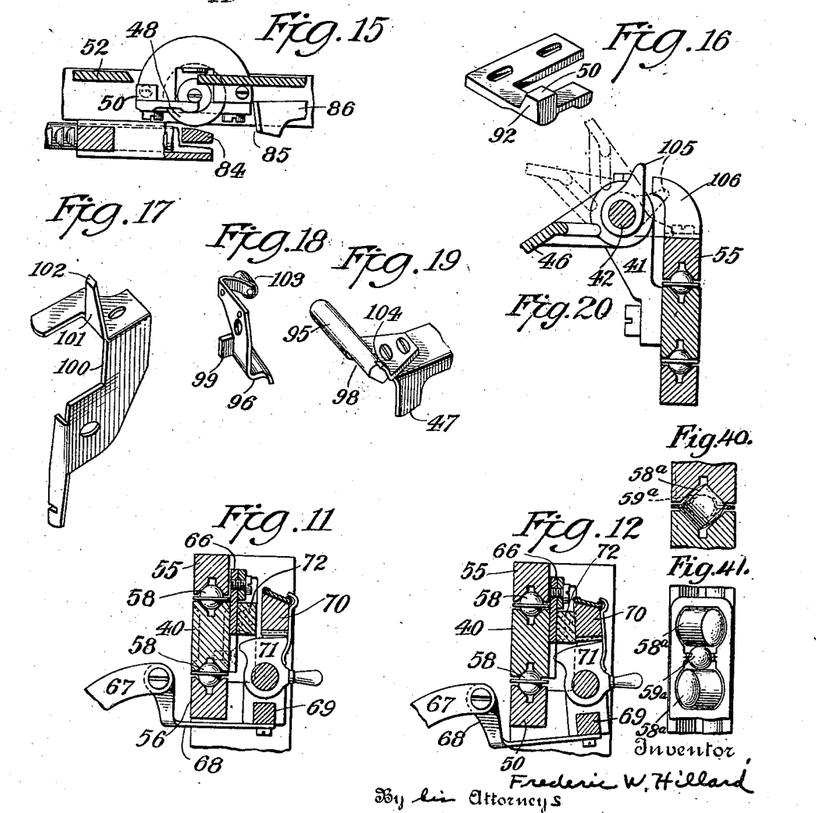
Fig. 11 is a sectional view of the truck and brake taken on line 11—11 of Fig. 10.
Fig. 12 is a view similar to Fig. 11 showing the brake mechanism.
Fig. 15 is a sectional view taken on line 15—15 of Fig. 13.
Fig. 16 is a perspective view of one of the parts of the locking device shown in Figs. 13, 14 and 15.
Figs. 17, 18 and 19 are perspective views of parts of the locking devices shown assembled in Figs, 2, 5 and 6.
Fig. 20 is a detail view showing the number three lock in various positions which it assumes at various carriage positions.
Figs. 40 and 41 are modified bearing constructions in which rollers are used in place of balls. These rollers are spaced apart by a spacing ball as shown.
Figure 13:
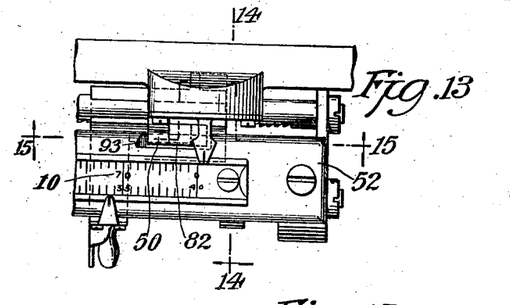
Fig. 13 is an enlarged plan view of the cut away portion of the guide rail showing the manner in which the carriage may be lifted.
Figure 24:
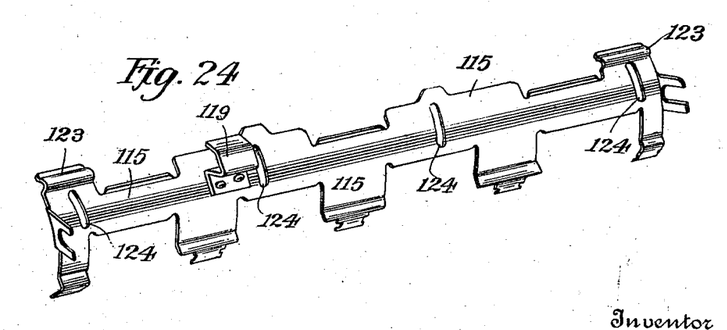
Fig. 24 is a perspective view of the paper feed plate and camming members thereon.

In order to obviate the above difficulty, I provide a camming projection 123 on the feed plate which is adapted to force the ribbon back away from the curved end 123$^a$ of the paper clip, see Figs. 12, 24 and 34. In certain cases as will hereafter be pointed out, the camming projection 123 is located at both ends of the feed plate.

I preferably provide the paper feed plate 115 with one or more slots 124. These slots enable the operator, by swinging the carriage to or toward its raised locked position, to inspect the work in the machine and determine how much space is left for writing when approaching the end of the sheet or card. These inspection apertures are of considerable utility in general writing and in tabulating work and on cards, etc., as they enable the operator to tell at all times just how much space is left for writing without removing the paper or card or feeding it forward or backward. They are particularly advantageous when employed in combination with the herein above described means for locking the carriage back on its raised position, for then the paper or card may be inspected throughout the entire length of the slots 124, for a considerable distance below the printing line.

I am aware that slots such as 124 have been employed heretofore and I accordingly make no broad claim to such slots. But my herein described construction differs from that heretofore employed in that in my structure the paper feed rolls 118 are spring pressed against the printing platen at a line in advance of the front ends of slots 124. See Figs. 22 and 23. Hence in my herein described structure the paper or card is under control of the rollers 118 even when fed to the forward ends of slots 124, which is not true of the prior devices. Hence my device is an improvement over prior ones and I claim it as such.

I also contemplate using my improvements with a right hand line space device 125 (Fig. 25) instead of the usual left hand line space device 126 (Fig. 1) as used on the Underwood machine.

Figure 25:
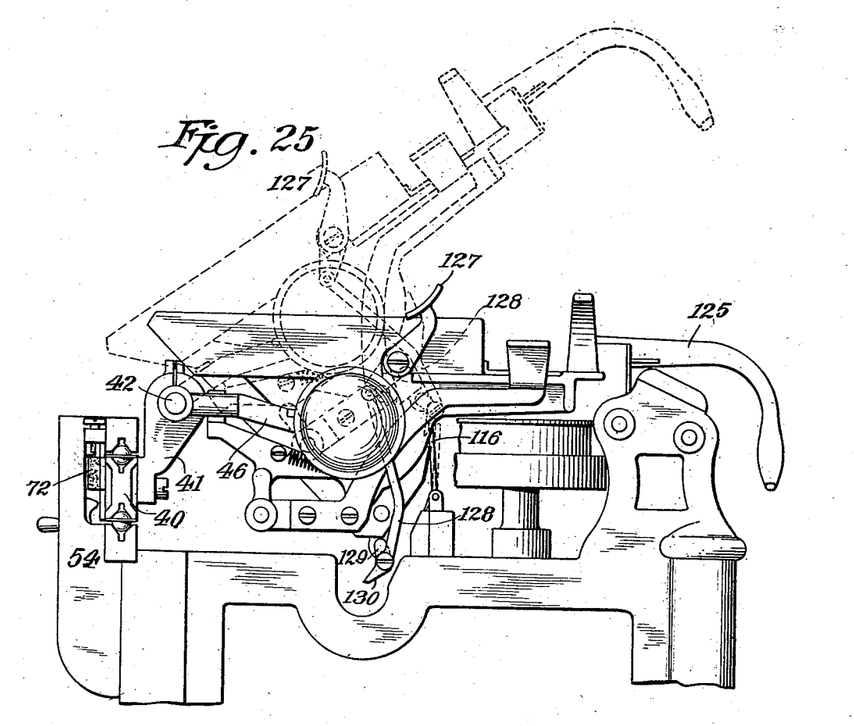
Fig. 25 is a view showing a modification in which the line spacing device is located at the right hand end of the machine and in which the feed roll releasing device is adapted to coöperate with the paper scales.

With the right hand line spacing device 125 the paper feed roll releasing devices comprising key 127, link 128 and bell crank 129 are transposed from their position at the right of the machine which shows the usual Underwood construction as shown in Figs. 1 to 4 and 25 to 32, to the left as shown in Fig. 25. When in this position part 129 will interfere with the paper scale 116 when the carriage is lowered. I accordingly provide a shoe or cam member 130 on the end of 128 which is adapted to cam the paper scale 116 outwardly upon the lowering of the carriage as shown by the dotted lines in Fig. 25.

Figure 3:
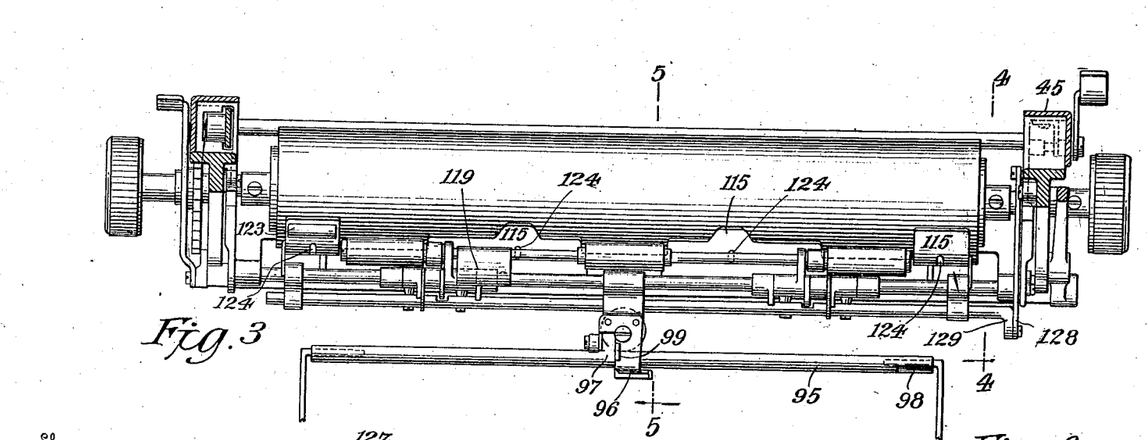
Fig. 3 is a front view of the inner paper carriage and shift rail. In this view the outer non-shifting carriage is shown in section.
Figures 4, 5:
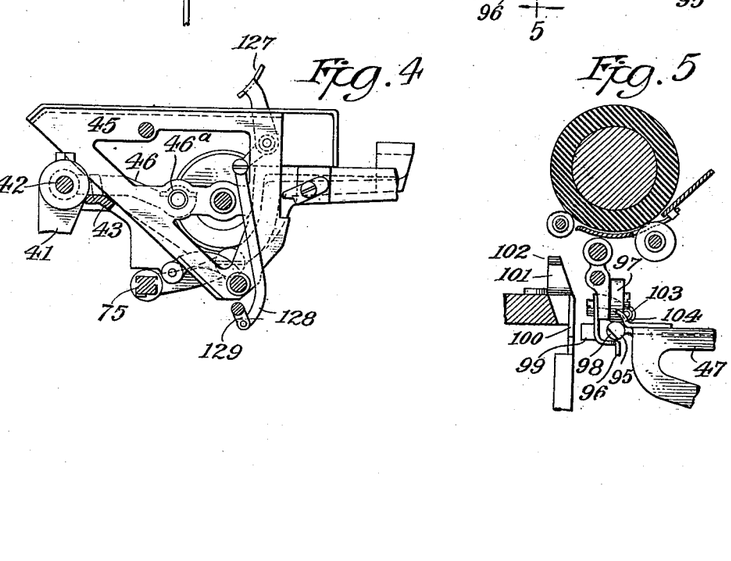
Fig. 4 is a section taken on line 4—4 of Fig. 3.
Fig. 5 is a section taken on line 5—5 of Fig. 3 showing the shift rail and inner carriage in lower case position and illustrating one of the locking devices for the carriage.
Figure 33:
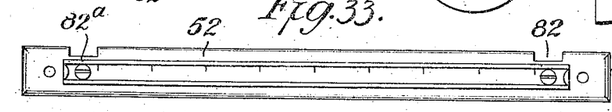

It will be understood that I do not wish to limit my invention to a construction in which the carriages can be swung about their hinge pivot 42 only when in right hand position. The carriage can be swung up when in extreme right or in extreme left positions or both as desired. When so constructed the upper front rail 52 is provided with an additional slot 82ᵃ at the left as shown in Fig. 33. When this is done it is necessary to change the location of camming members 119 and 123 on feed plate 115 if the releasing slot 82ᵃ be used exclusively in raising the carriage. Or preferably these members are duplicated at both ends of the feed plate 115, then the carriage can be lifted at either end of its line of travel through slot 82 or 82ᵃ. By so locating the camming members all interference with the paper scales and ribbon will be prevented. It will also be preferable to provide the shift rail 95 with a flattened portion at the left hand end similar to flat spot 98 on the right hand end as shown in Fig. 3.

Figure 26:
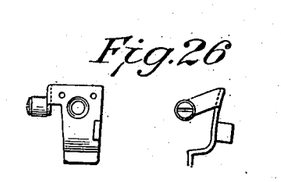
Figs. 26, 27 and 28 are views showing modified locking devices.
Figure 27:
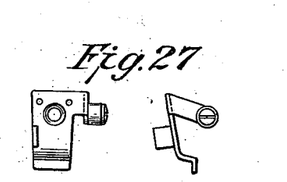
Figure 28:
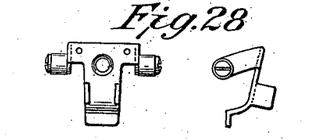

With the left hand position for lifting it is necessary to change the locking finger 96 from a right to a left hand construction as shown in Figs. 26 and 27 respectively. Or if the release of the carriages is to be at both ends of the guide rail the double construction shown in Fig. 28 may be used. It may be pointed out that the locking device as shown in these figures is not absolutely necessary when lifting the carriage at the left hand end of the line since the carriage is restrained against further movement to the left by the usual margin stop devices. However it is desirable to provide corresponding locks to prevent any restoring movement to the right of the carriage when the left hand release is used and the carriage lifted at the end of the line, since otherwise in restoring the carriage the number one lock might descend out of alinement with the notch in the front locking rail, and various other interferences would occur. The various other substitutions necessary for a change from left to right need not be described in more detail since these changes will readily occur to those skilled in the art. But in effect the locks would change from left hand locks, as shown in Figs. 1 and 2, to right hand locks; the locks in Figs. 1 and 2 being intended to prevent feed of the carriage to the left, the corresponding right hand locks to prevent feed of the carriage to the right.

It is to be understood that I do not limit my invention to a use in connection with a truck for supporting the rear of the carriages. If desired the regular Underwood rear track may be used as shown in Fig. 29.

Other substitutions and changes will readily occur to those skilled in the art, and my invention is more particularly set forth in the appended claims.

I claim:—

1. In a typewriting machine, in combination, a carriage support at the rear of the machine, a carriage structure pivotally mounted thereon and supported at the front on a guide rail, and a locking means to prevent an endwise movement of the carriage under the influence of the motor spring, said locking means being ineffective when the carriage structure is in normal operating position on the guide rail and becoming effective as the carriage is raised therefrom.

2. In a typewriting machine, in combination, with a carriage structure of the visible type, a truck at the rear of the machine to form a traveling support for the carriage, a pivotal connection intermediate the truck and the carriage whereby the carriage may be pivotally swung upward about the truck, and locking means to prevent an endwise movement of the carriage under the influence of the motor spring when the said carriage is being swung upward.

3. In a front strike typewriting machine, a carriage structure having a pivot mounting at the rear thereof to permit the carriage to be swung upwardly from its normal operating position on the front guide rail, and a lock to maintain the said carriage in elevated position, said carriage when in said elevated position tending to swing downwardly to writing position under the influence of gravity and said lock being adapted to prevent the said swinging movement and a lock to prevent the endwise movement of the carriage under the influence of the main spring when said carriage is in its elevated position.

4. In a front strike typewriter, in combination, a carriage structure adapted to be pivotally supported at its rear and to be supported and engaged by a locking rail at the front of machine, and means for permitting said carriage structure to be swung about its pivot, said means comprising a notched portion of the locking rail and a plurality of locks for preventing an endwise movement of the carriage under the influence of the motor spring during the swinging movement of the carriage.

5. In a front strike typewriter, in combination, a carriage structure adapted to be pivotally swung upward from one or more predetermined endwise portions in its normal position of engagement with a front guide rail, a lock adapted to cooperate with the carriage structure and maintain it in elevated position against the action of gravity.

6. In a front strike typewriter, in combination, a carriage structure adapted to be pivotally swung upward from its normal position of engagement with a front rail, a front locking rail adapted to prevent the said upward swinging of the carriage except at one or more predetermined endwise positions of the carriage, and means for preventing the endwise movement of the carriage during its upward swinging movement.

7. In a typewriting machine, in combination, with a carriage structure which is adapted to swing upwardly about a pivot at its rear from a normal position of rest upon a front guide rail, a front rail adapted to engage a projection from the carriage structure and prevent its being lifted, a notched portion in said rail to permit the lifting of the carriage at a predetermined endwise position thereof, a lock associated with the front locking rail to prevent endwise movement of the carriage during its initial movement away from the guide rail, a second lock adapted to prevent endwise movement of the carriage after it has passed from the control of the first mentioned lock, and a third lock adapted to prevent endwise movement of the carriage after it has passed from the control of the second mentioned lock.

8. In a front strike typewriting machine, in combination, a carriage structure which is adapted to be swung upwardly about a pivot at the rear thereof, and which is adapted to cooperate with the usual guide and locking rails at the front of the machine when in normal position, and locking means for preventing an endwise movement of the carriage under the influence of the motor spring when the carriage is swung upwardly out of control of the escapement.

9. In a front strike typewriting machine, in combination, a carriage structure having a pivot mounting at the rear thereof to permit the carriage to be swung upwardly from its normal operating position upon the front guide rail, and a plurality of overlapping and successively acting locks, said locks being normally ineffective and becoming effective at different points in the upward swinging of the carriage.

10. In a front strike typewriting machine, in combination, a carriage structure having a pivot mounting at the rear thereof to permit the carriage to be swung upwardly from its normal operating position upon the front guide rail, and a plurality of overlapping and successively acting locks, said locks being normally ineffective and becoming effective at different points in the upward swinging of the carriage, and a lock to lock the carriage structure in extreme elevated position.

11. In a typewriting machine, in combination, a carriage structure of the visible type and having a pivot mounting at the rear thereof to permit the carriage to be swung upwardly from its normal operating position upon the front guide rail, a plurality of locks to successively become effective to lock the carriage against endwise movement under the influence of the motor spring, the first of said locks becoming effective before the carriage has passed from the control of the escapement and the succeeding locks each becoming effective before the carriage has passed from the control of the preceding lock.

12. In a typewriting machine, in combination, a carriage structure of the visible type having a pivot mounting at the rear thereof to permit the carriage to be swung upwardly from its normal operating position upon the front guide rail, a plurality of locks to prevent endwise movement of the carriage under the influence of the motor spring, one of said locks being associated with the front locking rail, said lock being normally ineffective and becoming effective before the carriage has passed from the control of the escapement, a second of said locks being associated with the locking finger which cooperates with the shift rail, said lock being normally ineffective and becoming effective before the carriage has passed from the control of the first mentioned lock, and a third lock associated with the shaft forming the pivot mounting for the carriage, said lock being normally ineffective and becoming effective before the carriage has passed from the control of the second mentioned lock.

13. In a typewriting machine, a carriage structure which is adapted to be pivotally swung upward from its normal operating position said carriage structure comprising an inner shifting carriage and an outer non-shifting carriage, locking means for retaining said carriage structure in elevated position said locking means being adapted to prevent the shifting of the inner carriage in the outer carriage when in elevated locked position.

14. In a typewriting machine, in combination, a carriage structure which is adapted to be pivotally swung upwardly from its normal operating position, said carriage structure comprising an inner shifting carriage and an outer non-shifting carriage, and locking means for retaining the carriage structure in elevated position, said locking means being adapted to lift the inner carriage from lower to upper case position and to thereafter lock both inner and outer carriages against relative movement.

15. In a front strike typewriting machine, the combination of a carriage structure which is adapted to be swung pivotally upward from its operating position into a lifted one, a stop to limit the extreme upward movement of the carriage whereby the carriage normally tends to fall by gravity toward operating position, and locking means to retain the carriage in elevated position against the influence of gravity.

16. In a typewriting machine, in combination, a shiftable carriage, said carriage being pivoted at the rear thereof and adapted to be bodily swung upward about the pivot from its normal position of rest upon a front guide, a shift rail, a guide roller carried by the carriage and adapted to support the carriage upon the shift rail and a second roller adapted to contact with the shift rail when the latter is in upper case position and guide the first mentioned roller into position upon the downward swinging movement of the carriage.

17. In a typewriting machine, in combination, a shifting carriage, a shift rail therefor, a locking finger and guide roller normally supporting the shiftable carriage on the shift rail, said means comprising a cutaway portion on said rail whereby the locking finger can clear the shift rail in a predetermined endwise carriage position, and a pivotal support for the carriage to permit an upward swinging of the carriage upon its disengagement from its normal position of coöperation with the shift rail.

18. In a front-strike typewriting machine, in combination, a shifting carriage, a shift rail therefor, a locking finger and guide roller to normally lock and support the carriage to the shift rail, means for disengaging the locking finger from its normal position under the shift rail, said means permitting the disengagement at a predetermined endwise carriage position, a pivotal support for the carriage whereby when the locking finger is disengaged from the shift rail the carriage may be pivotally swung upward and a second roller carried by the carriage and adapted upon the downward movement of the carriage, to engage the shift rail and permit the guide roller to engage thereon when the shift rail is in upper case position.

19. In a typewriting machine, in combination with a pivoted visible writing shiftable carriage, a shift rail, a locking finger projecting downwardly from the carriage and normally engaging under the shift rail, a tongue associated with the shift rail and extending thereover, said tongue being adapted to abut against the locking finger and to prevent said finger locking over the top of the shift rail as it is being restored to normal position, substantially as described.

20. In a typewriting machine, in combination, a carriage, carriage propelling power means and an escapement to normally control the carriage, said carriage being adapted to be lifted to an elevated position and when so lifted to be released from the escapement, and locking means brought into operation by the lifting of the carriage to control the carriage against movement under the influence of the propelling power while the carriage is out of control of the escapement.

21. In a typewriting machine, in combination, a carriage, a carriage main spring and an escapement to normally control the carriage, means for normally locking the carriage down in its operative position, said carriage being adapted to be lifted to an elevated position at a predetermined point and when so lifted to be released from the escapement, and locking means at said predetermined position to control the movement of the carriage under the influence of the main spring while the carriage is lifted out of control of the escapement.

In testimony whereof I affix my signature in the presence of two subscribing witnesses.

FREDERIC W. HILLARD.

Witnesses:
 FELIX THOMAS,
 JOHN P. V. MCGUIRE.